United States Patent [19]
Coulon

[11] Patent Number: 5,176,402
[45] Date of Patent: Jan. 5, 1993

[54] DETACHABLE VEHICLE BELT GUIDE

[75] Inventor: James P. Coulon, Carmel, Ind.

[73] Assignee: Indiana Mills & Manufacturing, Inc., Westfield, Ind.

[21] Appl. No.: 748,092

[22] Filed: Aug. 21, 1991

[51] Int. Cl.⁵ .................. B60R 22/26; B60R 22/02
[52] U.S. Cl. .................... 280/807; 280/808; 297/474; 297/483
[58] Field of Search .......... 280/801, 804, 808, 807; 297/474, 483, 481

[56] References Cited

U.S. PATENT DOCUMENTS

| | | | |
|---|---|---|---|
| 4,272,104 | 6/1981 | Cuny | 280/808 |
| 4,645,232 | 2/1987 | Hamada et al. | 280/801 |
| 5,015,010 | 5/1991 | Homeier et al. | 280/808 |
| 5,016,916 | 5/1991 | Yokote et al. | 280/801 |

FOREIGN PATENT DOCUMENTS 2172192 9/1986 United Kingdom ............. 297/468

Primary Examiner—Margaret A. Focarino
Assistant Examiner—Tamara L. Graysay
Attorney, Agent, or Firm—Woodard, Emhardt, Naughton, Moriarty & McNett

[57] ABSTRACT

A three-point belt assembly is mounted to the seat frame removably mounted to a vehicle. The upper portion of the belt extends through a guide having a tongue thereon releasably lockable with a buckle mounted to the vehicle frame above the seat. In one embodiment, the guide tongue is pivotally constructed to facilitate swinging movement of the belt whereas in an alternate embodiment, the buckle is pivotally mounted to the vehicle frame above the seat facilitating pivotal web movement.

11 Claims, 3 Drawing Sheets

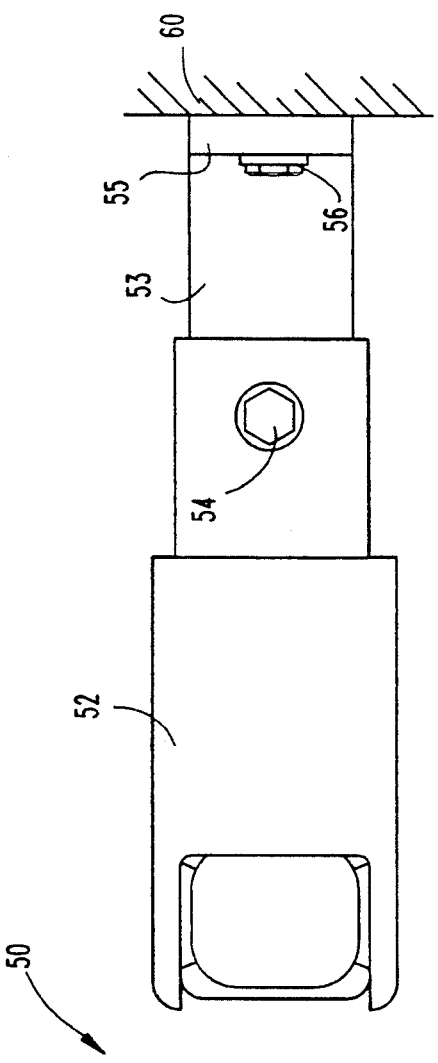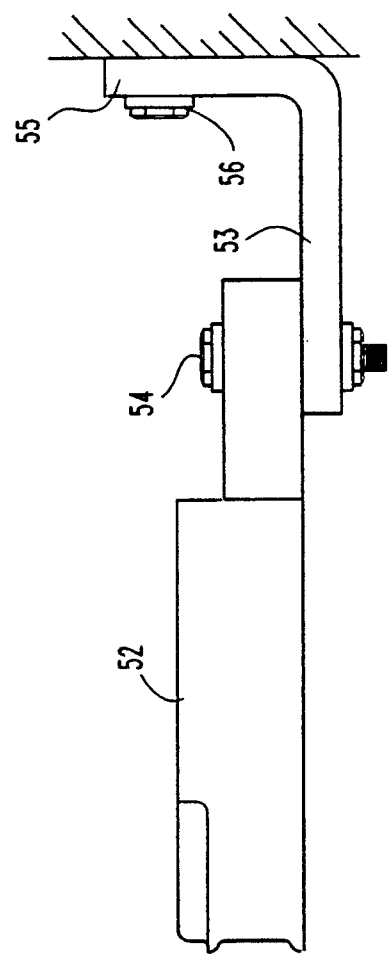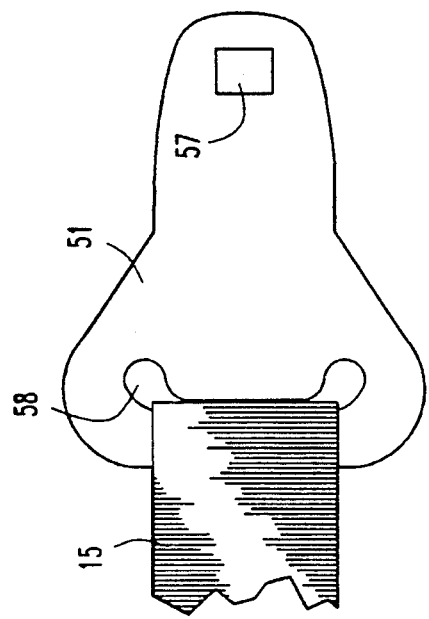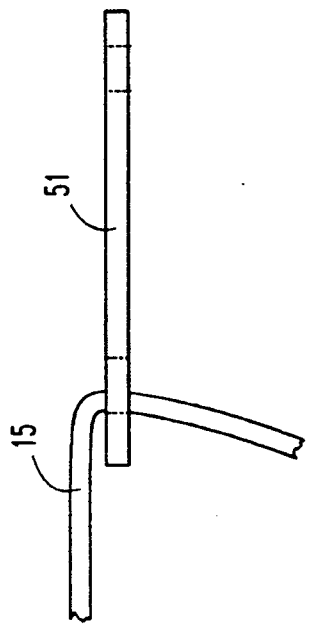
Fig. 4
Fig. 5

DETACHABLE VEHICLE BELT GUIDE

BACKGROUND OF THE INVENTION

1. Field of the Invention:

This invention is in the field of vehicle occupant restraint systems and more specifically belt guides used therein.

2. Description of the Prior Art:

A variety of seat belt assemblies have been devised to restrain the driver or occupant within a vehicle. A popular approach is the three-point belt assembly which utilizes a retractor having a belt extendable therefrom with the outer end of the belt fixed to the vehicle. A tongue slidably mounted to the belt between the retractor and belt outer end is lockingly engageable with a seat belt buckle affixed to the vehicle on the side of the seat opposite of the retractor. As the belt and tongue are extended across the seat to the buckle, a portion of the belt extends downwardly across the chest of the driver or passenger whereas the lower portion of the belt extends across the lap. Various types of guides, referred to as D-loops, are fixed to the vehicle above the seat to guide the belt upwardly from the retractor and then downwardly across the chest toward the buckle.

In many vehicles such as trucks, the entire seat belt assembly is mounted to the seat frame which in turn is movably mounted to the vehicle frame to provide adjustment as well as shock absorption. Such seats must be periodically removed from the vehicle for maintenance, custom fitting or other such purposes. In the event the three-point belt assembly is mounted to the seat frame then removal of the seat with belt assembly is awkard or time consuming since the belt extends through a belt guide affixed to the vehicle above the seat. There is therefore a need for a detachable belt guide to allow for the quick and easy removal of the belt guide when the seat and belt assembly are removed. Disclosed herein is such a detachable guide.

SUMMARY OF THE INVENTION

One embodiment of the present invention is a three-point belt assembly to secure a person in a vehicle seat including a retractor mountable to the vehicle and a belt extendable from the retractor. The belt has a first end secured to the retractor and a second end securable to the vehicle. The assembly includes a first connector movably mounted to the belt between the first end and the second end. The assembly further includes a second connector mountable to the vehicle with the second connector releasably lockable with the first connector when the first connector releasably lockable with the first connector when the first connector with belt is moved across the seat and engaged with the second connector. A guide through which the belt is slidable between the retractor and the first connector includes a third connector releasably engageable with a fourth connector mountable to the vehicle.

It is an object of the present invention to provide a detachable belt guide for use with a belt in a vehicle occupant restraint system.

A further object of the present invention is to provide a vehicle occupant restraint system with a detachable guide.

An additional object of the present invention is to provide a vehicle seat belt system with detachable guide which may be quickly removed from the vehicle.

Related objects and advantages of the present invention will be apparent from the following description.

BRIEF DESCRIPTION OF THE DRAWINGS

FIG. 4 is a plan view of an alternate embodiment of the detachable guide and buckle.

FIG. 5 is a side view of the guide and buckle of FIG. 4.

DESCRIPTION OF THE PREFERRED EMBODIMENTS

Figure 1:
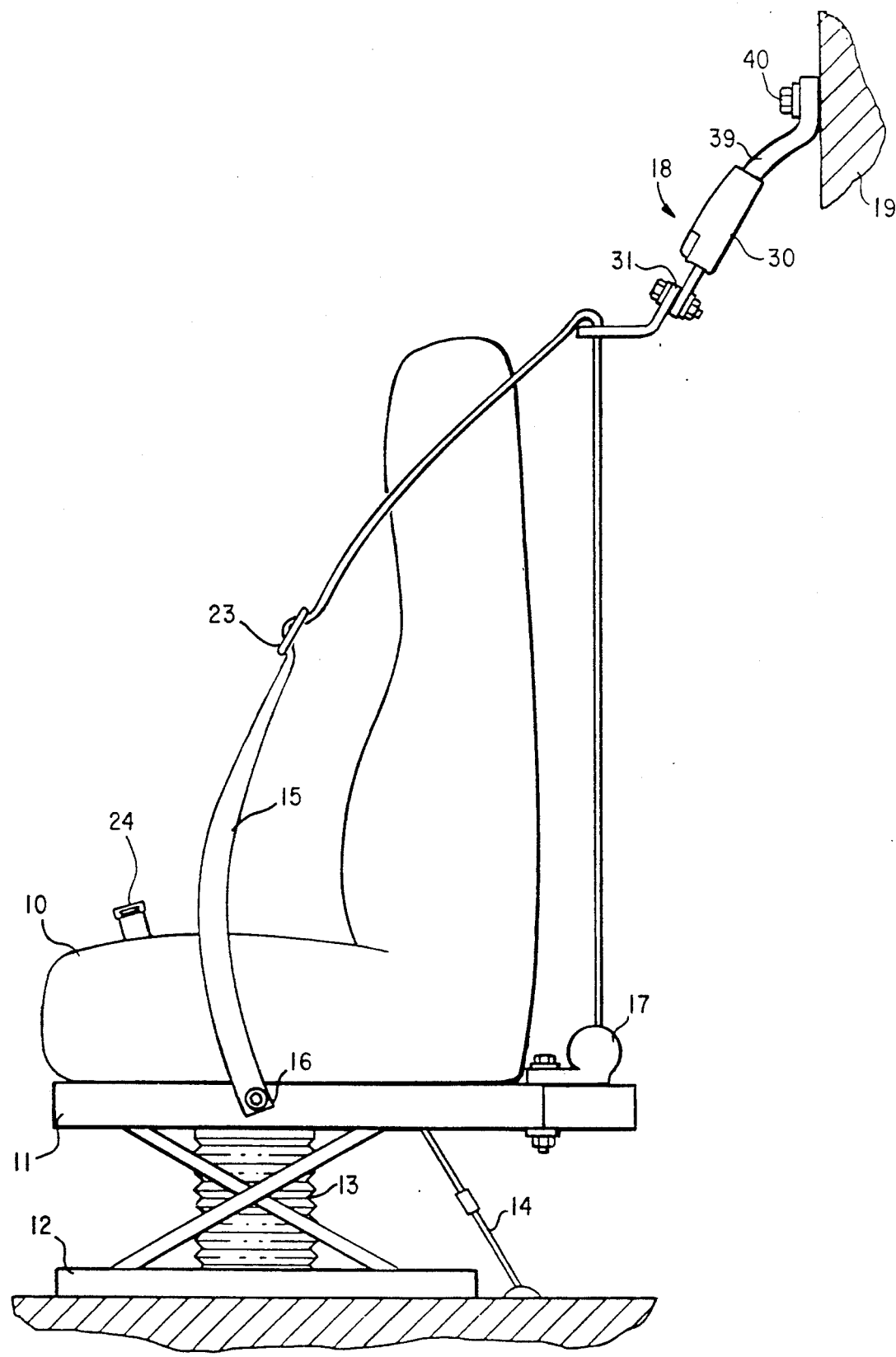
FIG. 1 is a side view of a vehicle seat with the preferred embodiment of the seat belt assembly with detachable guide incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the preferred embodiment of the present invention. Vehicle seat 10 includes a three-point belt assembly with detachable guide. Seat 10 is of conventional design and includes a seat frame 11 mounted atop a lower frame 12 removably mounted to the vehicle frame. Disposed between frames 11 and 12 is a conventional shock absorbing device 13 such as a fluid cylinder. Frame 12 may be secured to the vehicle frame by conventional means such as removable fasteners. A removable tether 14 further secures frame 11 directly to the vehicle frame.

The three-point belt assembly includes a belt 15 extendable from a conventional retractor 17 mounted to seat frame 11 by conventional fastening devices. Belt retractors are quite well known such as, for example, disclosed in the commonly owned U.S. Pat. No. 4,911,377 which is herewith incorporated by reference. The outer end 16 of belt 15 likewise is fixedly secured to the seat frame. A conventional tongue 23 is slidably mounted to belt 15 between the outer end 16 of the belt and belt guide 18 in turn mounted to that portion 19 of the vehicle frame which extends above the seat. Tongue 23 may be grasped and pulled across the seat and occupant to lockingly engage a conventional seat belt buckle 24 mounted to frame 11 but positioned on the opposite side of the seat as compared to retractor 17 and the free end 16 of the belt. Thus, the upper portion of the belt 15 between tongue 23 and guide 18 extends in conventional fashion across the chest of the seat occupant whereas the lower portion of the belt between end 16 and tongue 23 extends across the lap of the occupant.

The detachable guide 18 includes a seat belt buckle 30 and a buckle tongue 31 releasably lockable with the buckle. The preferred embodiment of guide 18 shown in FIGS. 1–3 includes a tongue 32 pivotally connected by a fastener 33 to a slotted guide main body 34. Main body 34 includes opposite end portions 35 and 36 integrally joined together. Slot 37 extends through end portion 35 allowing the belt to extend and slide through the guide from tongue 23 to retractor 17. End portion 36 is pivotally mounted to tongue 32 allowing the belt to pivotally swing relative to tongue 32 and buckle 30 facilitating the positioning of the belt over the seat occupant. In the embodiment shown in FIG. 2, the opposite end portions 35 and 36 are arranged at an included angle of less than 180° or approximately 90° allowing the belt to pivot without interference from the tongue 32 and buckle 30. The included angle may be varied depending upon the surrounding columns, chair position or other factors. That is, the included angle although eventually fixed may be designed taking into consideration the surrounding environment. Tongue 32 includes a conventional aperture 38 which is lockingly engageable with a latch contained within buckle 30 which is conventional in design. Buckle 30 shown in FIG. 1 is of an end release type design. Other types of buckles such as a conventional centrally located push button buckle may be utilized. Buckle 30 includes a proximal end 39 (FIG. 1) which is fixedly mounted by a conventional fastener 40 to portion 19 of the vehicle frame.

Figure 2:
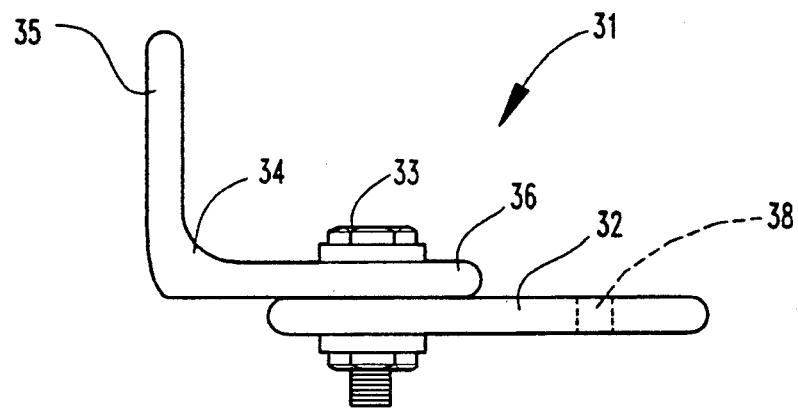
FIG. 2 is an enlarged side view of the detachable guide of FIG. 1.
Figure 3:
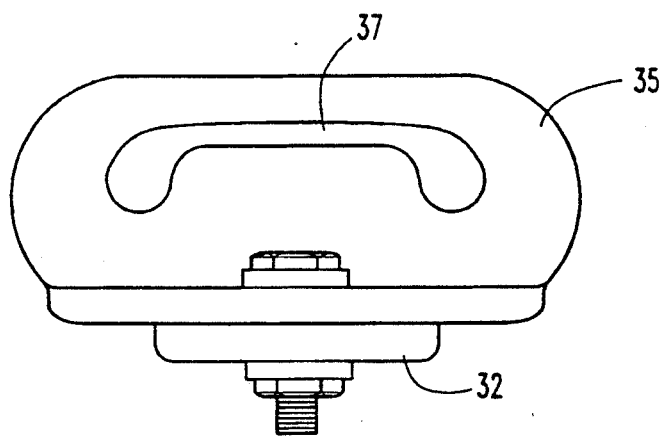
FIG. 3 is a right hand end view of the guide of FIG. 2.

The alternate embodiment of guide 18 is shown in FIGS. 4 and 5 and is identical to the preferred embodiment depicted in the FIGS. 1–3 except that the buckle is pivotally mounted to the vehicle frame and the slotted belt guide and tongue are integrally formed. Thus, guide 50 includes a tongue 51 lockingly engageable with a conventional buckle 52. The buckle is pivotally mounted to a mounting bracket 53 by conventional fastening device 54. In the embodiment shown in FIGS. 4 and 5, mounting bracket 53 is a right angle bracket with the upward turned leg 55 of the bracket being secured to the vertical portion 60 of the vehicle frame by conventional fastening device 56. The buckle is mounted to the frame at a position over the seat as is the case with the embodiment shown in FIG. 1. The buckle tongue 51 includes a first end portion with a slot 58 extending therethrough to slidingly guide belt 15 in a manner identical to that depicted in FIG. 1. The opposite end of the tongue includes an aperture 57 to lockingly engage a latch within buckle 52. Any type of conventional seat belt buckle is satisfactory for incorporation into the guide as buckle 52. Guide 50 allows the belt 15, tongue 51 and buckle 52 to pivot about the longitudinal axis of fastener 54 thereby allowing for the convenient positioning of belt 15 over the chest and lap of the seat occupant as previously described for the preferred embodiment.

Either the preferred embodiment shown in FIGS. 1–3 or the alternate embodiment shown in FIGS. 4 and 5 are operable to allow for the quick detachment of the guide from the vehicle frame. Thus, by simply removing the fastening devices attaching frame 12 and tether 14 to the vehicle frame, and by then unlocking tongue 32 from buckle 30 or tongue 51 from buckle 52, the seat along with the seat belt assembly and detachable guide may be quickly removed from the vehicle. Buckle 24 and tongue 23 provide respectively a first and second connector means which remain stationary when locked together even though the guide located at the top of the seat pivots. The design of either guide 18 or guide 50 is designed to locate the pivot axis of the guide apart from the vehicle frame to prevent interference.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An assembly of a belt, guide, seat and seat frame with said frame removably mounted in a vehicle comprising:
    a three-point belt sub-assembly to secure a person in the seat including a retractor mounted to the frame and a belt extendable from said retractor, said belt having a first end secured to said retractor and a second end secured to said frame, said sub-assembly including first connector means movably mounted to said belt between said first end and said second end, said sub-assembly further including second connector means mounted to said frame with said second connector means releasably lockable with said first connector means when said first connector means with belt is moved across said seat and engaged with said second connector means;
    a guide slidably mounted to said belt between said retractor and said first connector means with said guide including a slot with said belt extending slidably therethrough; and,
    combination means including a buckle and tongue with said combination means further including a pair of ends with said buckle located at one of said ends and said tongue located at another of said ends, said buckle and tongue being releasably lockable together but separable to move one of said ends away from the other of said ends by operation of said buckle, one of said ends being mounted to said vehicle which extends above the seat and the other of said ends having said guide mounted thereto with said means operable by unlocking said buckle from said tongue to allow said guide to be removed together with said three-point belt sub-assembly and said frame when said frame is removed from said vehicle.

2. The assembly of claim 1 wherein:
said tongue is slidably mounted to said belt and extendable releasably into said buckle.

3. The assembly of claim 2 wherein:
said buckle is fixed to the vehicle above the seat.

4. A vehicle seat belt system with detachable guide comprising:
    a three-point belt assembly to secure a person in a vehicle seat including a retractor mountable to the vehicle and a belt extendable from said retractor, said belt having a first end secured to said retractor and a second end securable to the vehicle, said assembly including first connector means movably mounted to said belt between said first end and said second end, said assembly further including second connector means mountable to said vehicle with said second connector means releasably lockable with said first connector means when said first connector means with belt is moved across said seat and engaged with said second connector means;
    a guide through which said belt is slidable between said retractor and said first connector means with said guide including third connector means;
    fourth connector means mountable to said vehicle releasably lockable with said third connector means to hold said guide;

a seat frame removably mounted to the vehicle with said retractor, said second end of said belt and said second connector means mounted to said seat frame; and wherein:

said third connector means and said fourth connector means are operable when unlocked to separate said guide from said vehicle allowing the seat belt system with said guide to be removed from the vehicle;

said guide includes a main body with a slot through which said belt slides, said fourth connector is pivotally mounted to said vehicle allowing said fourth connector and said guide with belt extending therethrough to pivot relative to said vehicle.

5. The seat belt system of claim 4 wherein:

said guide includes a main body with a slot through which said belt slides, said main body is pivotally mounted to said third connector means allowing said main body with belt extending therethrough to pivot relative to said fourth connector means and said vehicle;

said fourth connector means is a buckle and said third connector means is a tongue extendable releasably into said buckle.

6. The seat belt system of claim 5 wherein:

said retractor and said second end of said belt are mounted to said seat frame on an opposite side of the seat than said second connector means.

7. The seat belt system of claim 6 wherein:

said first connector means is a tongue slidably mounted to said belt and extendable releasably into said second connector means which is a buckle.

8. A detachable guide for use with a belt in a vehicle occupant restraint system comprising:

first connector means mountable to the vehicle;

second connector means releasably lockable with said first connector means; and, a main body with a slot to slidably receive and guide a belt in a vehicle occupant restraint system, said main body includes a first end portion and a second end portion integrally joined together, said first end portion includes a slot through which said belt slides, said second end portion is pivotally mountable to said second connector means allowing said main body with belt extending therethrough to pivot relative to said first connector means and said second connector means while said first connector means and said second connector means remain stationary; and wherein:

said first end portion and said second end portion are positioned together at an included angle of less than one hundred and eighty degrees allowing said belt to pivot without interference from said first connector means and said second connector means, said second connector means includes a tongue pivotally connected to said second end portion allowing said main body with belt extending therethrough to pivot.

9. A detachable guide for use with a belt in a vehicle occupant restraint system comprising:

first connector means mountable to the vehicle;

second connector means releasably lockable with said first connector means; and, a main body with a slot to slidably receive and guide a belt in a vehicle occupant restraint system, said main body includes a first end portion and a second end portion integrally joined together, said first end portion includes a slot through which said belt slides, said second end portion is pivotally mountable to said second connector means allowing said main body with belt extending therethrough to pivot relative to said first connector means and said second connector means while said first connector means and said second connector means remain stationary; and wherein:

said first end portion and said second end portion are positioned together at an included angle of less than one hundred and eighty degrees allowing said belt to pivot without interference from said first connector means and said second connector means.

said first connector means includes a buckle fixed to the vehicle above the seat.

10. A vehicle occupant restraint system with a detachable guide comprising:

a multi-point belt assembly to secure a person in a vehicle seat including a retractor mountable to the vehicle and a belt extendable from said retractor, said belt having a first end secured to said retractor and a second end securable to the vehicle, said assembly including first connector means movably mounted to said belt between said first end and said second end, said assembly further including second connector means mountable to said vehicle with said second connector means releasably lockable with said first connector means when said first connector means with belt is moved across said seat and engageed with said second connector means;

third connector means mountable to the vehicle;

fourth connector means releasably lockable with said third connector means; and, a main body with a slot to slidably receive and guide said belt, said main body includes a first end portion and a second end portion integrally joined together, said first end portion includes a slot through which said belt slides, said second end portion is pivotally mountable to said fourth connector means allowing said main body with belt extending therethrough to pivot relative to said third connector means and said fourth connector means while said third connector means and said fourth connector means remain stationary; and wherein;

said first end portion and said second end portion are positioned together at an included angle of less than one hundred and eighty degrees allowing said belt to pivot without interference from said third connector means and said fourth connector means, said fourth connector means includes a tongue pivotally connected to said second end portion allowing said main body with belt extending therethrough to pivot.

11. The vehicle occupant restrain system of claim 10 wherein:

said third connector means includes a buckle fixed to the vehicle above the seat.

* * * * *

UNITED STATES PATENT AND TRADEMARK OFFICE
CERTIFICATE OF CORRECTION

PATENT NO. : 5,176,402
DATED : January 5, 1993
INVENTOR(S) : James P. Coulon

It is certified that error appears in the above-identified patent and that said Letters Patent is hereby corrected as shown below:

In Column 1, lines 53-54 please delete "releasably lockable with the first connector when the first connector".

Signed and Sealed this

Nineteenth Day of October, 1993

Attest:

BRUCE LEHMAN

*Attesting Officer*     *Commissioner of Patents and Trademarks*